United States Patent
de la Cropte de Chantérac et al.

(10) Patent No.: US 10,083,105 B2
(45) Date of Patent: Sep. 25, 2018

(54) SMART ADVICE TO CHARGE NOTIFICATION

(71) Applicant: Apple Inc., Cupertino, CA (US)

(72) Inventors: Cyril de la Cropte de Chantérac, San Francisco, CA (US); Phillip Stanley-Marbell, San Francisco, CA (US); Kartik Venkatraman, Santa Clara, CA (US); Gaurav Kapoor, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 14/871,856

(22) Filed: Sep. 30, 2015

(65) Prior Publication Data

US 2016/0357654 A1    Dec. 8, 2016

Related U.S. Application Data

(60) Provisional application No. 62/172,015, filed on Jun. 5, 2015.

(51) Int. Cl.
| | |
|---|---|
| *H02J 7/00* | (2006.01) |
| *G06F 11/32* | (2006.01) |
| *G06F 1/32* | (2006.01) |

(52) U.S. Cl.
CPC .......... *G06F 11/327* (2013.01); *G06F 1/3203* (2013.01); *G06F 1/3212* (2013.01); *Y02D 10/174* (2018.01)

(58) Field of Classification Search
CPC .................................................. G06F 11/327

(Continued)

(56) References Cited

U.S. PATENT DOCUMENTS

| | | |
|---|---|---|
| 5,483,261 A | 1/1996 | Yasutake |
| 5,488,204 A | 1/1996 | Mead et al. |

(Continued)

FOREIGN PATENT DOCUMENTS

| | | |
|---|---|---|
| JP | 2000-163031 A | 6/2000 |
| JP | 2002-342033 A | 11/2002 |
| WO | WO-2016/196001 A1 | 12/2016 |

OTHER PUBLICATIONS

International Search Report for PCT/US2016/032909 dated Aug. 3, 2016, 5 pages.

(Continued)

*Primary Examiner* — Edward Tso
*Assistant Examiner* — Ahmed Omar
(74) *Attorney, Agent, or Firm* — Morrison and Foerster LLP

(57) ABSTRACT

Systems and methods are disclosed for advising a user when an energy storage device in a computing system needs charging. State of charge data of the energy storage device can be measured and stored at regular intervals. The historic state of charge data can be queried over a plurality of intervals and a state of charge curve generated that is representative of a user's charging habits over time. The state of charge curve can be used to generate a rate of charge histogram and an acceleration of charge histogram. These can be used to predict when a user will charge next, and whether the energy storage device will have an amount of energy below a predetermined threshold amount before the next predicted charging time. A first device can determine when a second device typically charges and whether the energy storage device in the second device will have an amount of energy below the predetermined threshold amount before the next predicted charge time for the second (Continued)

device. The first device can generate an advice to charge notification to the user on either, or both, devices.

21 Claims, 11 Drawing Sheets

(58) Field of Classification Search
USPC .......................................................... 320/132
See application file for complete search history.

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,358,298 | B2 | 1/2013 | Lee et al. |
| 8,479,122 | B2 | 7/2013 | Hotelling et al. |
| 8,665,214 | B2 | 3/2014 | Forutanpour et al. |
| 8,798,685 | B2 | 8/2014 | Stekkelpak et al. |
| 2005/0049729 | A1 | 3/2005 | Culbert et al. |
| 2006/0135217 | A1* | 6/2006 | Sung .................... H02J 7/0044 455/573 |
| 2006/0197753 | A1 | 9/2006 | Hotelling |
| 2007/0067136 | A1 | 3/2007 | Conroy et al. |
| 2010/0117579 | A1 | 5/2010 | Culbert et al. |
| 2011/0080422 | A1 | 4/2011 | Lee et al. |
| 2011/0301777 | A1 | 12/2011 | Cox et al. |
| 2012/0169608 | A1 | 7/2012 | Forutanpour et al. |
| 2012/0284547 | A1 | 11/2012 | Culbert et al. |
| 2013/0103960 | A1 | 4/2013 | Alberth et al. |
| 2013/0254563 | A1 | 9/2013 | Culbert et al. |
| 2013/0326239 | A1 | 12/2013 | Andrews et al. |
| 2014/0082383 | A1 | 3/2014 | De Cesare et al. |
| 2014/0082384 | A1 | 3/2014 | De Cesare et al. |
| 2014/0289543 | A1 | 9/2014 | Flores Assad et al. |
| 2015/0084778 | A1* | 3/2015 | Mittal .............. G01R 19/16542 340/636.16 |
| 2015/0338892 | A1 | 11/2015 | Culbert et al. |
| 2016/0357232 | A1 | 12/2016 | Kalyanasundaram et al. |

OTHER PUBLICATIONS

Written Opinion of the International Searching Authority for PCT/US2016/032909 dated Aug. 3, 2016, 8 pages.

Ravi et al., "Context-aware Battery Management for Mobile Phones", PERCOM '08 Proceedings of the Sixth Annual IEEE International Conference on Pervasive Computing and Communications, Hong Kong, Mar. 17-21, 2008, pp. 224-233.

Lee, S.K. et at (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westernman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

PCT Chapter I International Preliminary Report on Patentability (IPRP Chapter I) PCT/US2016/032909 dated Dec. 14, 2017. (10 Pages).

* cited by examiner

SMART ADVICE TO CHARGE NOTIFICATION

RELATED APPLICATIONS

This United States Patent application claims priority under 35 U.S.C. § 119(e) of U.S. Patent Application No. 62/172,015, filed Jun. 5, 2015, and entitled "SMART ADVICE TO CHARGE NOTIFICATION," which is incorporated herein by reference to the extent that it is consistent with this disclosure.

TECHNICAL FIELD

This disclosure relates to the field of determining that an electronic device needs to be charged. Specifically, the disclosure is directed to systems and methods that advise a user to charge the electronic device.

BACKGROUND

A modern battery-powered electronic device can monitor the charge level of one or more batteries in the electronic device. Typically, when the battery level falls below a predetermined threshold value of remaining charge, then the electronic device notifies the user with a message such as "battery low" or other visual and/or audible indicator of the remaining charge level.

Often, a "battery low" indication that is based on a fixed threshold of charge remaining is not received in time for the user to take a corrective action. For example, if a user typically charges her smart phone at night, but forgets to do so on one occasion, receiving a "battery low" indication just before leaving for work the next day does not leave the user time to charge her phone before work.

SUMMARY OF THE DESCRIPTION

Embodiments are described for learning energy usage and charging patterns of a user of an computing system. By detecting a user's patterns in charging, and analyzing current and past state of charge information, it can be determined whether a user will run out of energy before her next charge. Given a current state of charge of an energy storage device computing system, a notification can be sent to the user if there is a high probability that the user is unlikely to make it until the next high probability charge time. For example, if the computing system notifies a user to charge at a fixed value of 10% remaining charge, and it is determined that the user typically charges at 10:00 p.m., and it is now 10:00 p.m., and the energy storage device currently has 30% remaining charge, then the user will not receive a notification to charge based upon the fixed charge level of the energy storage device. However, if analysis of the current, and stored, state of charge information indicates that the user will not make it to their next high probability charge time without running out of energy, the computing device can display an advice to charge notification at 10:00 p.m., even though the current state of charge is greater than the fixed threshold of 10% remaining energy.

In an embodiment, a computing system for predicting when a user will charge an energy storage device in a computing system can include one or more energy storage devices, a charging system, a real-time clock, one or more data storage devices, an energy measurement system, and an "advice to charge" module. The energy measurement system can measure current state of charge of an energy storage device and store the measurement in a state of charge database on a storage device. State of charge of the energy storage device can be measured periodically, in intervals, such as 15 minutes. State of charge data can be date-time stamped using the real-time clock. A database of computing system activities can be generated as the computing system is used. Activities can be based on sensor data, such as a location sensor, time of day, whether the computing system is in motion, and whether the charging system is currently plugged into a wall outlet. The "advice to charge" module can analyze the state of charge information to determine when a user is likely to charge and whether the energy storage device will have a level of charge remaining that is below a predetermined threshold amount before the next forecasted charging time.

In an embodiment, a method of generating state of charge information can include measuring and storing, at a plurality of regular intervals, a state of charge of one or more energy storage devices used by a computing system of a user. In an embodiment, state of charge information can be date/time stamped. In an embodiment, a current location of the computing system can be detected and stored. The location can be anonymized. The location can be stored in association with the current state of charge information stored at the time the location was detected. In an embodiment, a location of one or more other computing systems of the user can be detected and stored.

In an embodiment, a method of advising a user to charge a computing system can include querying a database of state of charge data for a plurality of intervals of time. From the state of charge data, a state of charge curve for the computing system can be generated over the plurality of intervals of time. The plurality of intervals of time can be selected to overlap a current time, and a similar past time, such as one week ago, two weeks ago, or three weeks ago. The plurality of intervals of time can alternatively be selected as being of a similar type of day as the current day, such as a work day or weekend day. In an embodiment, a rate of charge histogram can be generated over the same plurality of intervals as the state of charge curve. In an embodiment, an acceleration of charge histogram can be generated. Using current state of charge and one or more of the state of charge curve, rate of charge histogram, or acceleration of charge histogram, a time can be determined, with high probability, at which the user is likely to next charge the energy storage device in the computing system. A time at which the energy storage device will have a level of energy that is less than a predetermined threshold amount, unless charged at the forecast time, can also be determined. If the energy storage device will be below the predetermined threshold amount of charge before the next forecast charge, then a responsive action can be taken. In an embodiment, the user can be notified that he is advised to charge soon.

In an embodiment, a first computing system of a user can acquire state of charge information about a second computing system of the user. The first computing system can determine the current state of charge of an energy storage device in the second computing system and a state of charge curve from the state of charge information over a plurality of time intervals. The first computing system can also predict when the energy storage device in the second computing system will have less than a predetermined of charge remaining, if not charged by a time determined by the first computing system. The first computing system can take a responsive action if the energy storage device in the second computing system needs to be charged before the next forecasted charging time on the second computing system.

At least certain embodiments include an environment with a calling software component interacting with a called software component through an API. A method for operating through an API in this environment includes transferring one or more function calls, messages, other types of invocations or parameters via the API.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for predicting when a user charges her computing system, and whether the computing system charge level will be below a predetermined threshold amount before the next predicted charging time.

Figure 1:
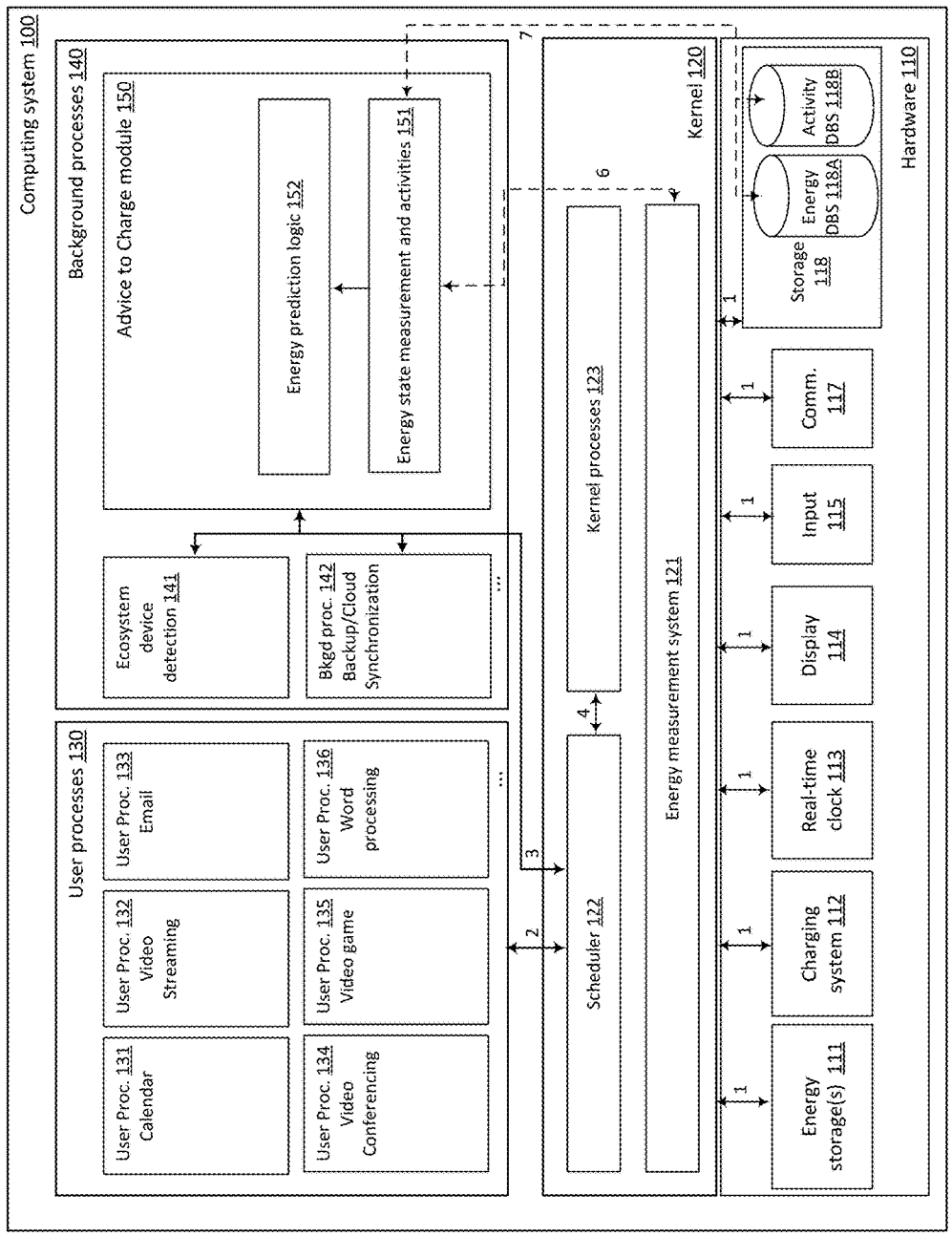
FIG. 1 illustrates, in block diagram form, a system for predicting when a user will charge his electronic device according to some embodiments.

FIG. 1 illustrates, in block diagram form, a computing system 100 that can predict when a user will charge the computing system 100 according to some embodiments.

A computing system 100 can include hardware 110, kernel 120, user processes 130, and background processes 140.

Hardware 110 can include energy storage(s) 111, charging system 112, real-time clock 113, display 114, one or more input devices 115, one more communication modules 117, and one or more storage devices 118.

Energy storage(s) 111 can include one or more battery packs, capacitive storage, or other rechargeable energy storages 111. Charging system 112 can include a converter module that converts a supplied voltage and current, such as from a wall outlet, into a voltage and current that is compatible with energy storage(s) 111. Charging system 112 can further include a solar power source, electro-magnetic wave charger, a generator, or other external source of voltage and current. Energy storage 111, charging system 112, or both, can include circuitry and logic that implement one or more charging algorithms that optimize conversion of external power sources for storage in the one or more energy storages 111. Charging system 112 can include a charging signal that can be detected by energy measurement system 121. The charging signal can indicate that the charging system 112 is plugged into an external power source such that the charging system 112 can convert external power to energy for storage in energy storage(s) 111. In an embodiment, energy measurement system 121 can generate a record indicating that the charging system 112 is plugged into an external power source and is providing energy to energy storage 111.

Real-time clock 113 can be used to add a date/time stamp upon state of charge records that are periodically recorded, as discussed more fully below. While a real-time clock 113 is beneficial, real-time clock 113 is not essential to the inventive concepts disclosed herein.

Display 114 can display an information or alert notification to a user, such as advising the user to charge computing system 100. A notification can prompt a user for a response, such as "snooze" and repeat the notification at a later time, or "dismiss" the notification and do not redisplay the notification at a later time. A notification can be generated on a first device and displayed on a second device. A notification can be generated by a first device, and displayed on the second device. For example, first device can be an electronic watch and a second device can be a smart phone. The smart phone can determine that the watch needs to be charged, and can display an appropriate notification to a user on the smart phone, and vice versa. A response to a notification can be provided using one or more user input devices 115, such as a keypad, touch screen, keyboard, mouse, track ball, voice command, and the like. A notification can be displayed on a first device, and a response can be input on a second device. A notification regarding the first device can be displayed on both the first and second device. A response to the notification can be input on either the first device or the second device.

One or more communications modules 117 can include a near-field communication module, a WiFi module, a cellular communication module, an Ethernet communication module, satellite communication module, or a USB communication module. Such communications modules can transfer messages and data between a plurality of devices of a user.

Storage 118 can include one or more hard disks, flash drives or other solid-state memory, battery-backed RAM or other storage. Storage 118 can store state of charge information about energy storage 111, current sensor information, application launches, location of a device, and other information useful in determining when a computing system may need to be charged.

Kernel 120 can include an energy measurement system 121. In an embodiment, energy management system 121 can reside in user processes 130 or background processes 140. Energy management system 121 can measure the state of charge of one or more energy storage(s) 111. In an embodiment, energy management system can measure the current state of charge of a battery pack 111 and can generate a state of charge record for the battery pack 111. In an embodiment, the state of charge record can include a date/time stamp. In an embodiment, a state of charge record can be generated at regular intervals, such as every 15 minutes. State of charge records can be stored in energy database 118A for later query and analysis. In an embodiment, energy measurement system 121 can be a background process 140 or a user process 130. Kernel 120 can further include process scheduler 122 and kernel processes 123.

User processes 130 can include typical user applications such as a calendar application 131, a video player such as streaming device, e.g. Apple TV® 132, an email application 133, a video conferencing application 134, a video game 135, or a word processing application 136. User processes 130 can include other applications as well.

Background processes 140 can include an ecosystem device detection process 141 for detecting presence of another device of a user. Background processes can further include a backup/synchronization process 142 for synchronizing data across computing systems of a user or backing up data from a computing system to a cloud storage device. For example, synchronization process 142 can synchronize state of charge data across one or more computing systems of a user. Background processes 140 can further include an advice to charge module 150. Advice to charge module 150 can retrieve current and historic state of charge information from energy measurement system 121 and/or energy database 118A using energy state measurement and activities module 151. Activities stored in activity database 118B can include information from a wide variety of sensors on computing system 100 to use in conjunction with state of charge information so that energy prediction logic 152 can issue one or more appropriate notifications to a user. For example, activity information from database 118B can include that a first computing system of a user is located in a same location as a second computing system of a user and that the location is "home." Activity information can further include a record of applications launched, locations detected, motion, calendar information, and other information detected by one or more sensors, or combination of sensors, on a computing device. Energy prediction logic 152 can determine that the second device needs charging and can generate a notification to the user, on the first device, that the second device needs to be charged.

Figure 2:
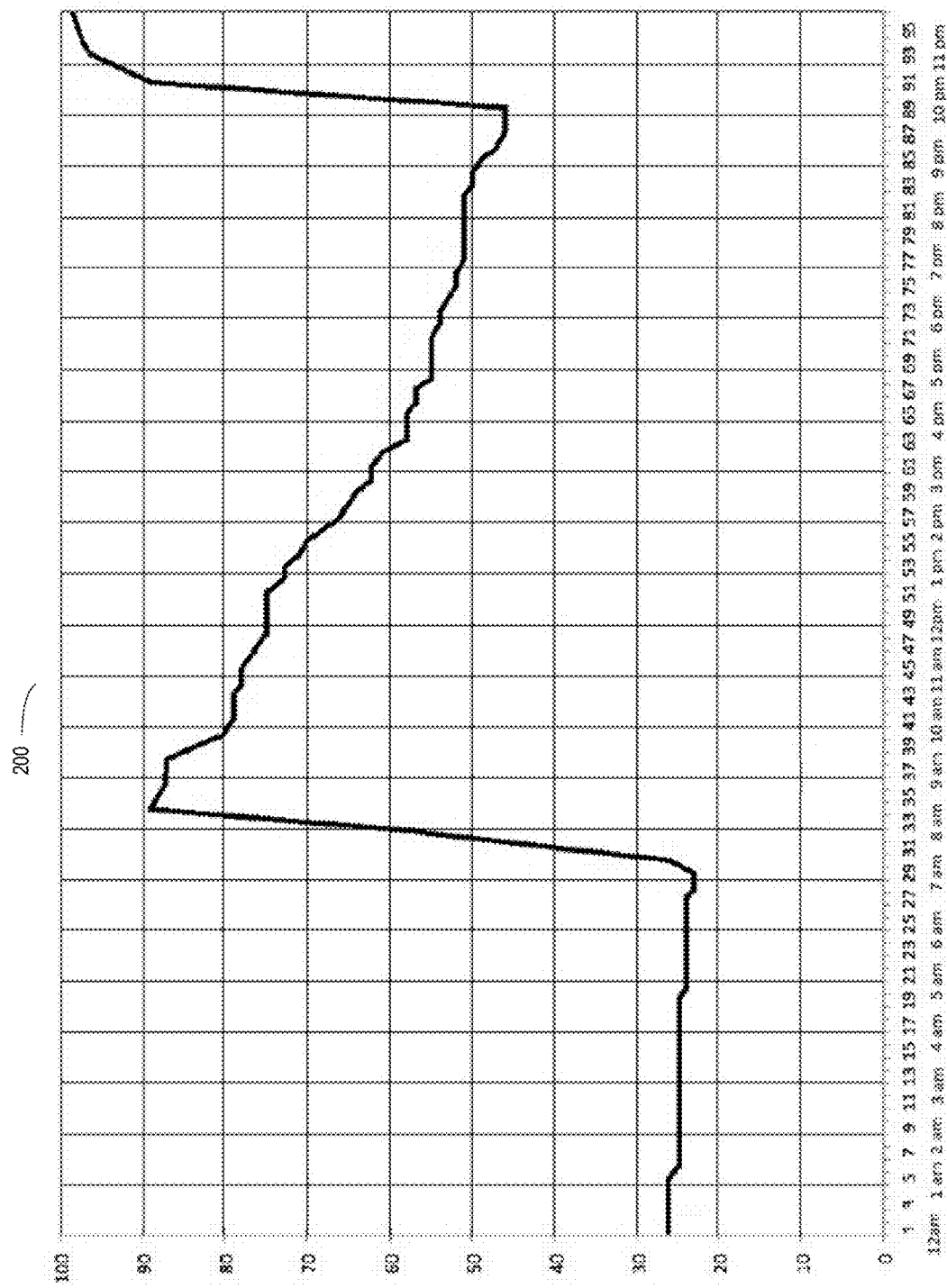
FIG. 2 illustrates an example state of charge curve of an electronic device.

FIG. 2 illustrates an example state of charge curve 200 of an energy storage device 111 in a computing system 100. The example curve 200 is shown over a 24 hour period. Each state of charge sample can represent a value from 0% to 100% of the measured energy stored in energy storage 111. In this example state of charge curve 200, a state of charge record of the energy storage 111 is generated every 15 minutes for a total of 96 data points over a 24 hour period. Energy measurement system 121 can take state of charge measurements at any interval. State of charge measurements can be stored in energy database 118A for retrieval and analysis by advice to charge module 150.

In this example, state of charge information is shown beginning at 12:00 a.m. midnight. However, any point of time will do. From the state of charge curve 200 it is apparent that computing system 100 is essentially idle and slowly discharging from about 27% charge remaining at 12:00 a.m. down to about 22% charge remaining at 7:00 a.m. The user appears to awaken and begin charging the computing system at about 7:00 a.m. State of charge appears to rise rapidly over the next hour or so, up to about 89% at about 8:30 a.m. After 8:30 a.m., the charge appears to decline steadily until about 10:00 p.m., when the user appears to charge the computing system again. From about 10:00 p.m., state of charge rises rapidly until state of charge reaches about 90%. Then, the rate of charge lessens until about 97% charge, then the rate of charge lessens again.

A premise of this disclosure is that, for a given day of the week, a user's patterns in charging are very predictable over time. For example, on Monday through Friday, a user may charge her computing system when she arrives at work at 8:30 a.m., and then charge her computing system again before going to bed at about 10:00 p.m. Similarly, a user may have a different pattern on weekends when she does not work.

Thus, to determine the charging habits of a user for a particular day of the week, energy state measurement and activities module 151 in the advice to charge module 150 can query energy database 118A for all state of charge records for the computing system 100 for 7 days ago, 14 days ago, and 21 days ago. Patterns can be determined from these records, as discussed more fully below.

Figure 3:
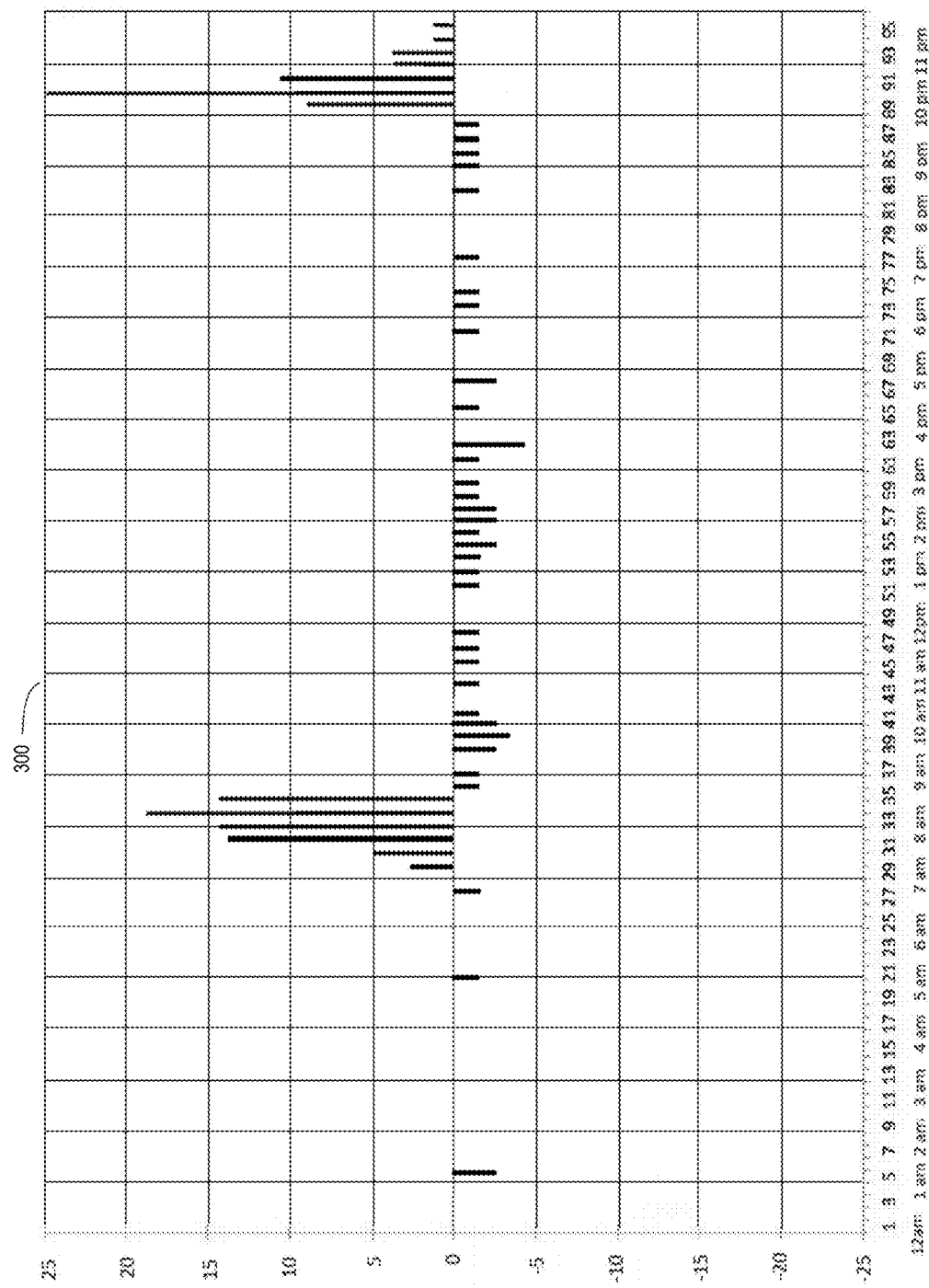
FIG. 3 illustrates a rate of charge histogram corresponding to the example state of charge curve of FIG. 2.

FIG. 3 illustrates a rate of state of charge histogram 300 corresponding to the example state of charge curve 200 of FIG. 2. A rate of charge histogram 300 can be produced by computing a first derivative of state of charge curve 200 data. The rate of charge histogram 300 can use the same horizontal axis as the state of charge curve 200. In this example curve 300, rate of charge values are computed for each of the state of charge samples taken every 15 minutes over a 24 hour period as in FIG. 2. Rate of charge values can be positive, during charging, and also can be negative during discharging, or zero when no change in state of charge is detected. In the example rate of charge histogram 300, zero values (no change in rate of charge) are not shown.

As can be seen by comparing the example state of charge curve 200 and the corresponding rate of charge histogram 300, the rate of charge histogram 300 has negative values for decreasing state of charge of the energy storage 111 and positive rate of charge values for an increasing state of charge of the energy storage 111. It can also be seen that a typical charge time from about 25% to about 90% takes about 1½ hours (FIGS. 2 and 3, data points 29 through 33). Similarly, typical charge time from about 45% state of charge to about 98% state of charge takes a little less than 2 hours (FIGS. 2 and 3, data points 89 through 96).

Energy prediction logic 152 can analyze multiple days of stored data to determine when a user will likely charge her computing system 100. In an embodiment, energy prediction logic 152 can retrieve the last 5 weekdays of state of charge data, generate a rate of charge histogram for each of the last 5 weekdays, and average the rate of charge data to determine when a user will likely charge her computing system.

Figure 4:
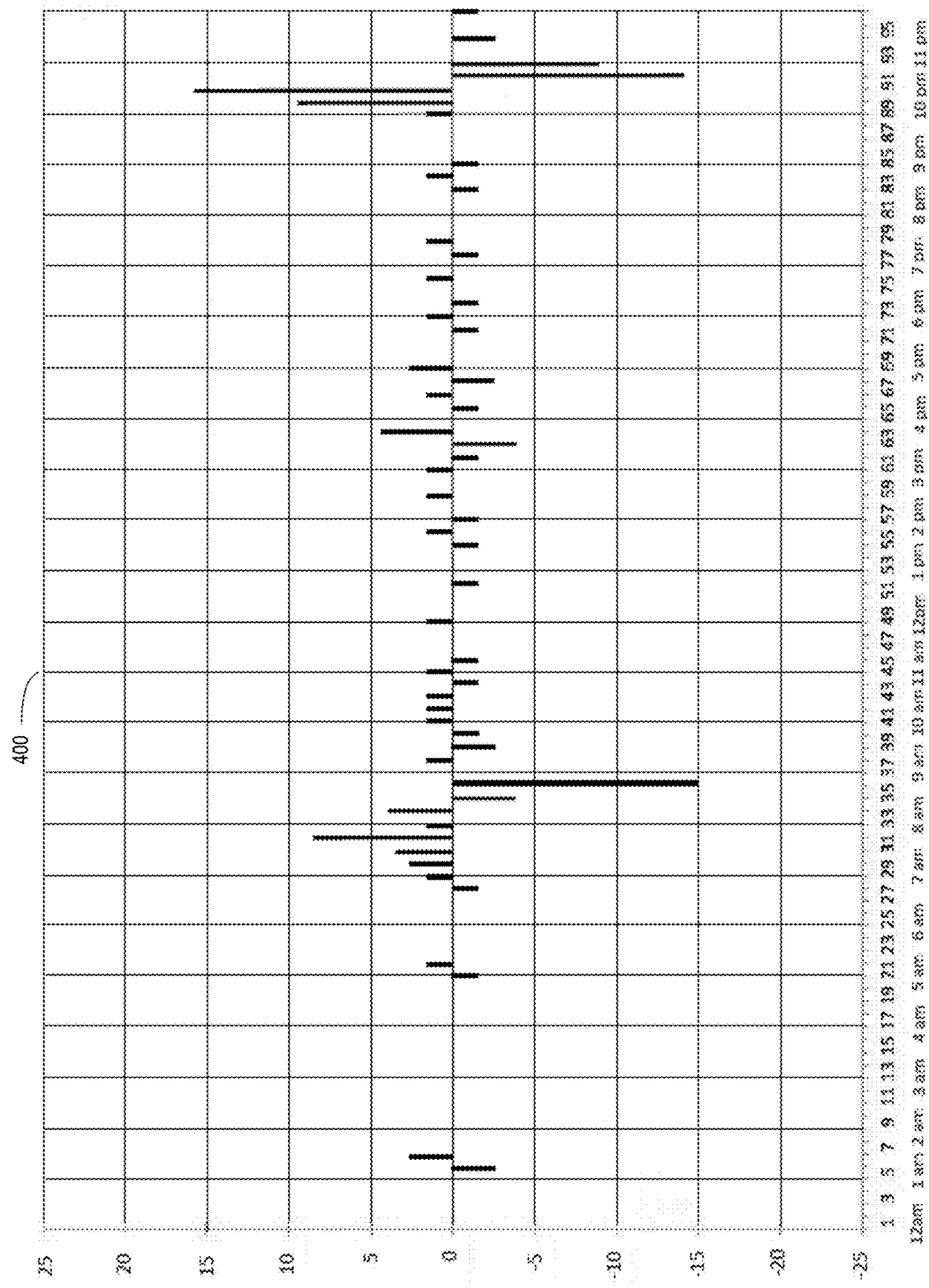
FIG. 4 illustrates an acceleration of charge histogram corresponding to the example state of charge curve of FIG. 2 and corresponding rate of charge histogram of FIG. 3.

FIG. 4 illustrates an acceleration of charge histogram 400 corresponding to the example state of charge curve 200 of FIG. 2 and corresponding rate of charge histogram 300 of FIG. 3. The acceleration of charge histogram 400 can act as a probability density function indicating when a user is likely to charge her computing system. A high positive magnitude indicates a high probability that a user will charge her computing system at that time.

An acceleration of charge histogram 400 can be produced by computing rate of charge histogram 300 as described with reference to FIG. 3, above, then taking a first derivative of rate of charge histogram 300 data. The acceleration of charge histogram 400 can use the same horizontal axis as the state of charge curve 200 and rate of charge histogram 300. In this example histogram 400, acceleration of charge values are computed for each of the rate of charge values over 15 minute intervals for 24 hour period as in FIG. 3. Acceleration of charge values can be positive, when the rate of charge is increasing. Rate of charge often increases from the beginning of a charge cycle until about 90% state of charge is reached. At about 90% state of charge, many charge algorithms reduce the rate of charge. Accordingly, charging decelerates and acceleration of charge values can have a substantial negative magnitude, such as data point 35 and data points 91 and 92. Within a group of positive acceleration values, a high magnitude of charge is obtained at, and just before, a relatively high acceleration of charge value. Thus, a high positive acceleration of charge value has high probability of indicating a charging cycle wherein an energy storage device will receive a substantial amount of energy.

Energy prediction logic 152 can analyze multiple days of stored data to determine when a user will likely charge her computing system. In an embodiment, energy prediction logic 152 can retrieve current state of charge data and state of charge data for a corresponding date that was 1 week ago, 2 weeks ago, and 3 weeks ago. The current and past historic data can be averaged together to generate a state of charge curve 200. In an embodiment, the average can be a weighted average. For example, different ages of data can be weighted differently. In an embodiment, older state of charge data can be weighted lower than more recent state of charge data. From the generated state of charge curve 200, a rate of charge histogram 300, and an acceleration of charge histogram 400 can be generated. The rate of charge histogram 300, and to an even greater extent the acceleration of charge histogram 400, can show when a user typically charges the computing system.

Figure 5:
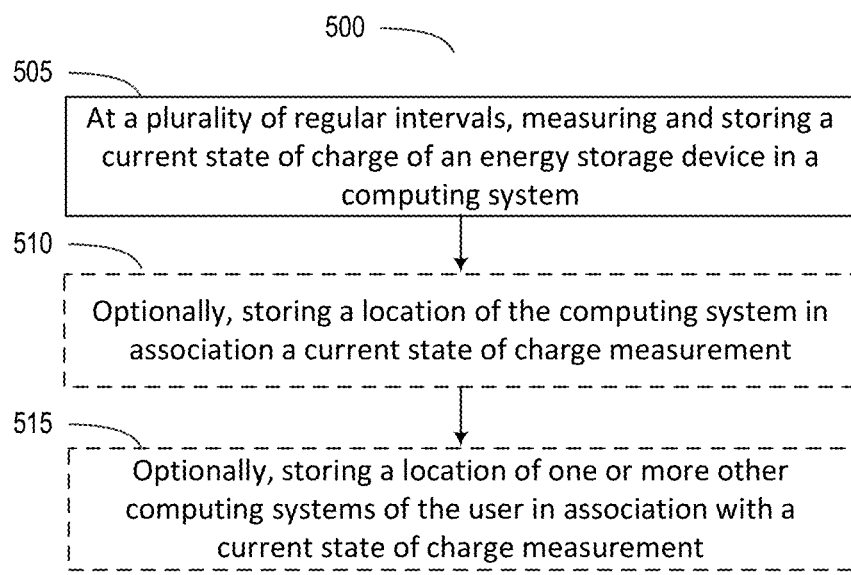
FIG. 5 illustrates, in block diagram form, a method of generating state of charge information on a computing system according to some embodiments.

FIG. 5 illustrates, in block diagram form, a method 500 of generating state of charge information on a computing system 100 according to some embodiments.

In operation 505, at regular intervals, on an ongoing basis, energy measurement system 121 can measure a current state of charge of an energy storage device 111. In an embodiment, the measurement can measure the current amount of energy stored in the energy storage device 111. The current amount of energy stored in the energy storage device 111 can be scaled to a percentage value of the full capacity of the energy storage unit. For example, a current state of charge measurement might be 4000 milliamp hours for a battery having a capacity of 5000 milliamp hours. Thus, the measured current state of charge measurement can be stored as a 4000 milliamp hours. In an embodiment, the current state of charge measurement can be stored as 80%. In another embodiment, both 4000 milliamp hours and 80% are stored in a state of charge record. The state of charge record can have a date/time stamp. In an embodiment, a state of charge record can have a sample number in a sequence of samples for a fixed period. For example, a sample scheme would measure current state of charge every 15 minutes over a 24 hour day, yielding 96 samples per day. A current state of charge record could be marked, e.g., as sample number 48 of 96 on day 1.

An advantage of transforming current state of charge data to a percentage is that a user may have a pattern of charging an energy storage device 111 when the current state of charge of the energy storage device 111 falls below a certain value, such as 35%, regardless of how much actual energy the energy storage device 111 can hold. Having state of charge data stored as a percentage of full capacity of the energy storage device can simplify utilization of the state of charge data.

In operation 510, generating state of charge information can further optionally include storing a location of the computing system at the time that the current state of charge is measured and stored in operation 505. When current state of charge information is analyzed, a time can be determined at which as user will charge the energy storage device 111 within the computing system. Storing the location of the computing system allows energy prediction logic 152 to determine where a user is mostly to charge. For example, if a user typically charges at 8:30 a.m., it is likely that the user is at work. The computing system can detect and store an anonymized location that is known to the computing system as "at work." In an embodiment, an anonymized location can be given a universally unique identifier (UUID) that is associated with a specific location, e.g. GPS coordinates, WiFi identifier, or cell towers, indicating a physical location that the computing device can identify as "home," "work," or other relevant location. Similarly, if a user typically charges at 10:00 p.m. at night, and stops using the computing system for a 6 to 8 hours, it is likely that the user is at home. The computing system can store an anonymized location that is known to the computing system as "at home." Similarly, the computing system can store an anonymized location that is known to the computing system as "at work."

In operation 515, computing system 100 can optionally determine where other computing systems belonging to the user are currently located. For example, the user's smart phone can detect that the user is at home. The user's electronic watch can also determine that the watch is located at home. The smart phone can determine whether the electronic watch needs to be charged and provide a notification to the user to charge her electronic watch before leaving home for work.

Figure 6:
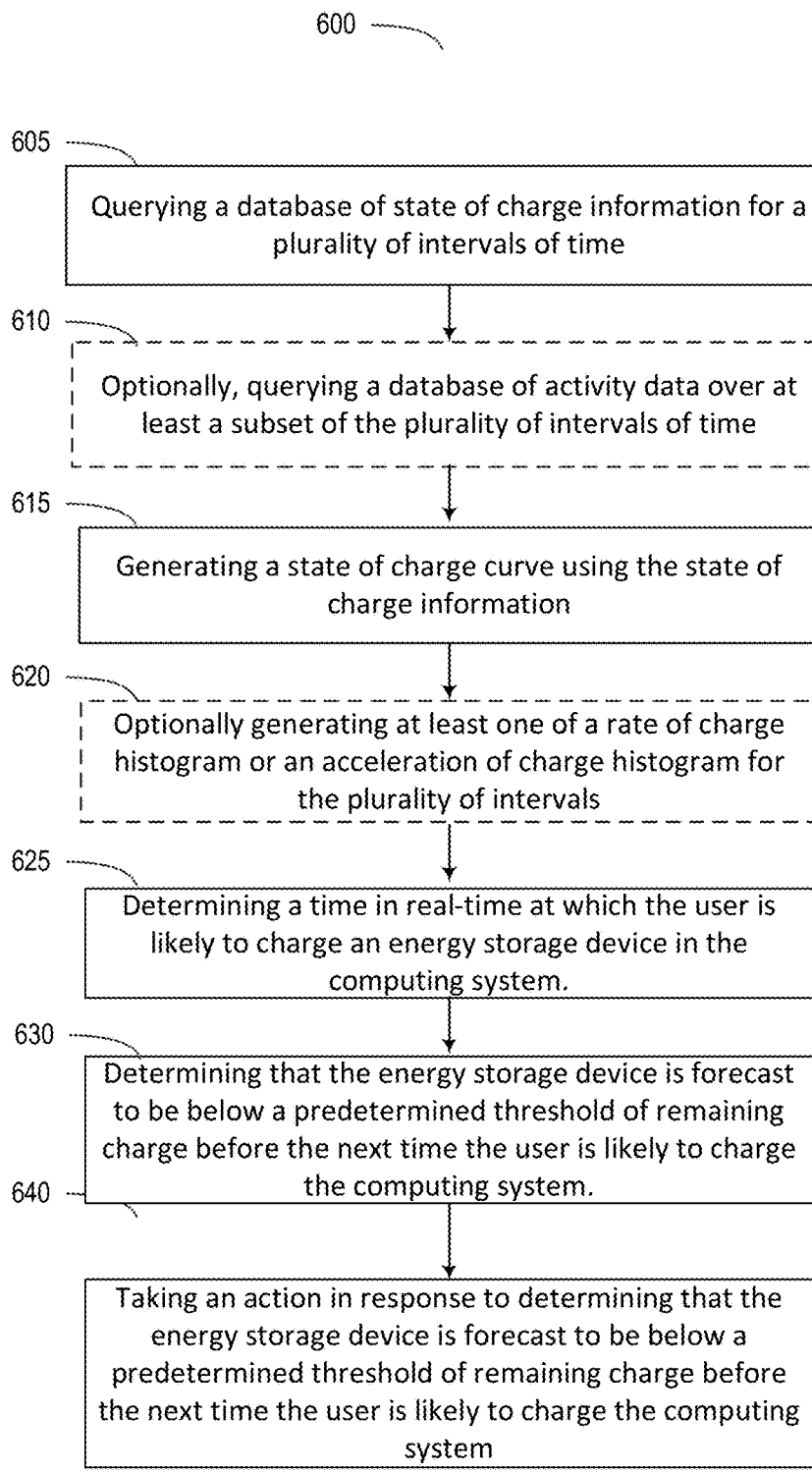
FIG. 6 illustrates, in block diagram form, a method of predicting when a user will charge his computing system according to some embodiments.

FIG. 6 illustrates, in block diagram form, a method 600 of predicting when a user will charge her electronic device according to some embodiments. As a practical matter, even though state of charge information may be recorded as often as every 15 minutes, predicting when a user will charge her computing system 100 can be performed every few hours or so. In an embodiment, predicting when a user will charge her computing system 100 can be performed in response to an event, such as the rate of discharge of the energy storage device 111 exceeding a threshold rate, or the state of charge of energy storage device 111 being less than a threshold amount, such as 30%. The computing system can build an updated state of charge curve as in operation 200, and one or more of an updated rate of charge histogram 300 or an acceleration of charge histogram 400. These can be correlated with other data stored with state of charge information to determine an appropriate notification to a user.

In operation 605, a computing system 100 can query a database 118A of state of charge information for a plurality of intervals of time. An interval of time can be day, an hour, or a sub-interval of an hour, such as 15 minutes. In an embodiment, operation 605 can query for state of charge information for a range of hours for one or more days that are similar to the current day. In an embodiment, one or more days similar to a current day can be a day that is 7 days, 14 days, or 21 days earlier than the current day. In an embodiment, the current day is a work day, and similar days are one more days when historic data indicates that the user charged the computing system 100 at work. In an embodiment, the current day is not a work day and similar days are one or more days when historic data indicates that the user did not charge the computing system 100 at work.

In operation 610, computing system 100 can optionally query a database of activity data 118B over at least a subset of the plurality of intervals of time of operation 605. Activities can include information gathered by operation of the computing system 100 and sensors on the computing system 100. Activities can be time stamped. Activities can be associated with state of charge data using the activity and state of charge respective time stamps. Activities can include detecting a location of the computing system 100. Location can be determined using GPS sensors, triangulating off of cell towers, identifying one or more WiFi signals, or coupling the computing system 100 to a network. Activities can further include a state of the computing system 100, such as powered ON or OFF, in standby, coupled to a charger, coupled to a network, and whether the device is in motion. Device motion can be further classified as walking, driving, stationary, or flying by utilizing one or more sensors of computing system 100. Activities can further include determining a foreground application, launching or terminating an application, issuing a local or remote query, and logging user selections of items on, or using, the computing system 100. Activities can be used as heuristics to assist energy prediction logic 152 in determining when a user is likely to charge computing system 100.

In operation 615, energy prediction logic 152 can generate an internally-stored state of charge curve 200 using state of charge information retrieved in operation 605 and, optionally, activity data retrieved in operation 610. State of charge information can be measured in energy units or can be transformed into a percentage value from 0% to 100%. In an embodiment, the state of charge curve 200 can be generated by averaging state of charge information for pluralities of intervals that are similar to a plurality of intervals to the current day. For example, energy prediction logic 152 can generate a state of charge curve 200 for the current day by averaging history state of charge data for a day 7 days previous, 14 days previous, and/or 21 days previous to the current day. In an embodiment, historic data can be given a varying weighted average. For example, historic state of charge data that is 21 days previous to the current day can be given a greater, or lesser, weight that current state of charge data. In an embodiment, historic state of charge data of differing ages can be given differing weights based upon age. In an embodiment, historic data can be weighted more heavily based on similarity to current data. Similarly, historic data can be weighted less heavily based on dissimilarity to current data.

In operation 620, energy prediction logic 152 can optionally generate at least one rate of charge histogram 300 from state of charge curve 200. Rate of charge histogram 300 can be computed as a first derivative of state of charge curve 200. Operation 620 can optionally, either in addition or alternatively, generate an acceleration of state of charge histogram 400. An acceleration of state of charge histogram 400 can be generated by computing a second derivative of state of charge curve 200 or a first derivative of rate of charge histogram 300.

In operation 625, energy prediction logic 152 can determine a time at which the user is likely (with high probability) to charge the computing system 100. The energy prediction logic 152 can use several different techniques to determine when, during the selected plurality of intervals, the user typically charges. The state of charge curve 200, generated from historic and current data, can be analyzed to determine when a user typically charges. As is readily seen on example state of charge curve 200 of FIG. 2, the time when a user charges is characterized by a low initial state of charge followed by a relative peak state of charge over approximately a 1 to 1½ hour time period. The rate of charge histogram 300 readily illustrates this phenomenon with a densely packed high magnitude of rate of charge, surrounded by zero, or negative, rate of charge. The acceleration of charge histogram 400 also readily shows a charge cycle with densely packed high magnitude acceleration of charge surrounded by zero, or negative acceleration of charge. Analysis of the state of charge curve 200, rate of charge histogram 300 and acceleration of charge histogram 400 can be confirmed with charger system 112 "plug in" events and "unplug" events stored in activity database 118B.

Additional activity data in database 118B can be used as a heuristic to infer charging. For example, a user may typically charge the computing system immediately upon arriving at work in the morning and immediately upon arriving at home in the evening. Sensors on the computing system 100 can detect that the user has just arrived at work. If the user maintains his pattern, there is a high probability that he user will charge the computing system 100 soon. Sensors on the computing system 100 can also detect that the user has arrived at home. Again, there is a high probability that the user will charge the computing system 100 soon. Correlating these activities from sensors and historic data 118B with current and historic state of charge information can reinforce the heuristics of the activities in determining when a user will charge her computing system.

In operation 630, energy prediction logic 152 can determine that energy storage device 111 in the computing system 100 is likely to be below a predetermined threshold amount of remaining charge before the next time that the user is likely to charge the computing system. Energy measurement system 121 can report the current state of charge of energy storage device 111. Energy prediction logic 152 can determine a current rate at which the computing system 100 is consuming charge from the energy storage device 111. In an embodiment, energy prediction logic 152 can determine the average energy consumption of the computing system 100 over a recent period time, such as the last 1 hour, last 3 hours, the last 6 hours, or a weighted average of these, and determine an average rate of energy consumption.

Given the current state of charge, if the average state of energy consumption indicates that energy storage device 111 will be below a predetermined threshold level of charge before the determined next charging time, then, in operation 640 energy prediction logic 152 can take an appropriate responsive action. This action, in one embodiment, is taken without using a predetermined threshold value (for battery charge state); that is, the determination to take the action is performed without using such a value as a metric to determine whether to take the action. In this embodiment, the predetermined threshold value is not used in deciding when to advise to charge the device. In an embodiment, energy prediction logic 152 can preemptively generate an early alert to the user that the energy storage device 111 will likely be below a predetermined level of remaining charge before the user's next predicted charge time. Here, again, sensors can be used to determine an appropriate action. If a real-time clock 113 indicates it is 11:00 p.m. on a week night, and the user is at home, then "taking an action" can include the computing system 100 entering a reduced power mode, or a standby mode, that consumes very little energy. In an embodiment, a computing system 100 "taking an action" can include powering itself down to save charge until a later time. In an embodiment, taking an action can include determining a rate of discharge at which the computing system 100 is predicted to have remaining charge in the energy storage device 111 until at least the next predicted charging time for the computing device, and putting the computing system in a mode wherein the energy storage device 111 discharges no faster than the determined discharge rate to make it to the next predicted charge time.

Figure 7:
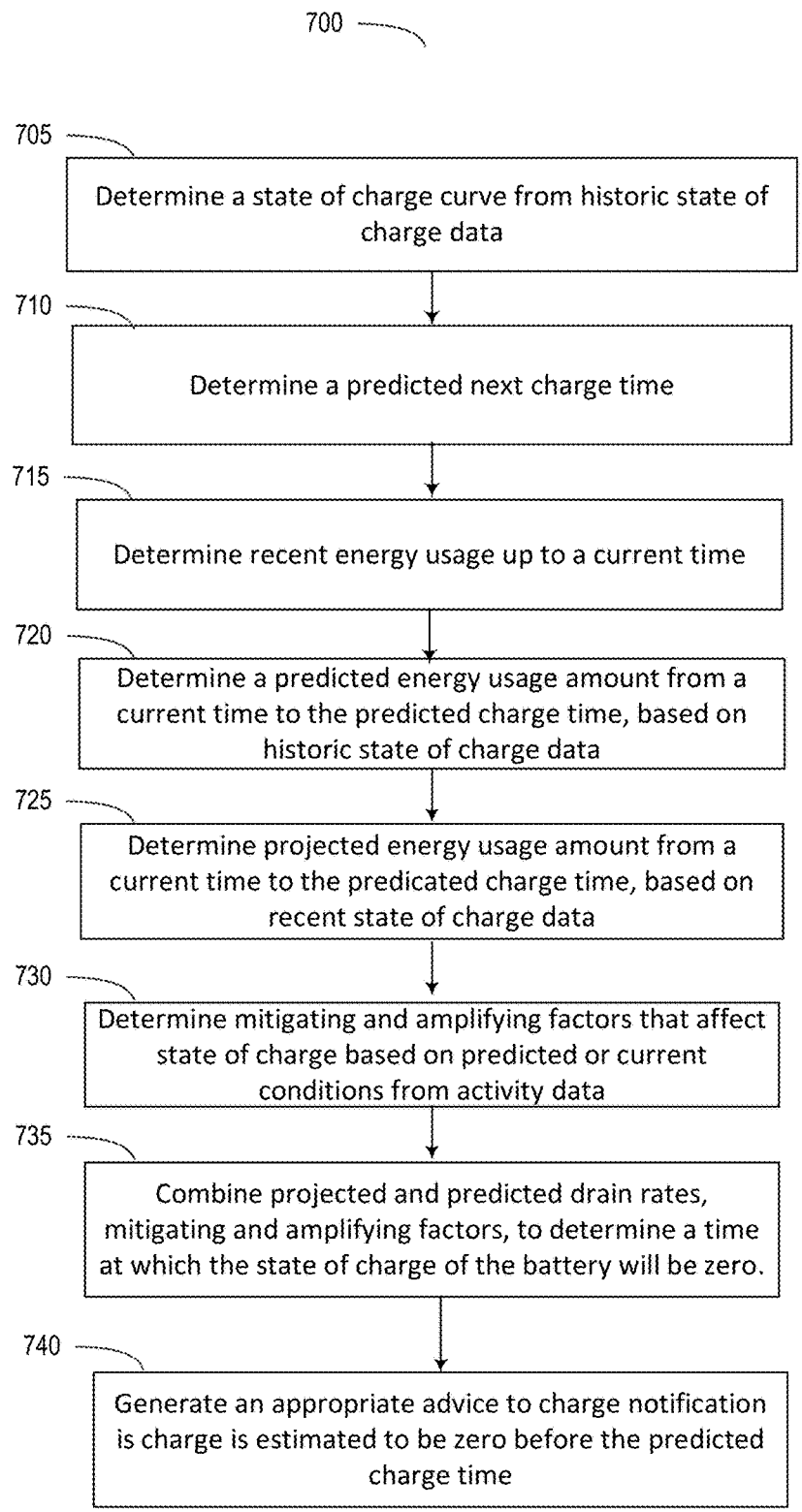
FIG. 7 illustrates, in block diagram form, a method of determining when a state of charge of a computing system of a user is likely to reach zero.

FIG. 7 illustrates, in block diagram form, a method 700 of determining when a state of charge of a computing system of a user is likely to reach zero. The determination can be made by taking into account a combination of recent past energy usage, a predicted time when the computing system will be charged, and projected and predicted energy usage between a current time and the time that the computing system is predicted to be charged. In the following explanation, predicted energy data can be based upon a state of charge curve 200 that is based upon a plurality of a similar past time intervals, e.g. a plurality of Mondays. Projected energy data can be based upon recent past energy usage, such as the last 1 to 3 hours, or over a plurality of intervals since the user last unplugged a charging device. In an embodiment, recent past energy usage is up to a current time. In addition to determining predicted and projected energy rates for a period of time, method 700 can take into account current, instantaneous state of charge and rate of charge information. For example, method 700 may consider whether the current state of charge at the current time is greater or less than the state of charge at the same time of day according to historic state of charge data. In addition, if the instantaneous rate of charge is currently very high, or very low, in relation to historic state of charge data, method 700 can also take that into account when determining a zero charge time.

In operation 705, method 700 can use historic state of charge information 118A to generate a state of charge curve 200 over a range of time. In an embodiment, the range of time can include at least one instance wherein the user has a high probability of charging her computing system. In an embodiment, the range of time can be a day. Generating a state of charge curve 200 is described with reference to FIG. 2, above, and FIG. 6, reference elements 605, 610, 615, and 620. For purposes of determining when an energy storage device is likely to have a remaining charge level below a predetermined threshold value, operation 705 may additionally retrieve activities data from database 118B. For example, operation 705 may correlate application launches and running applications with predetermined time intervals to help operation 725, below, determine the reasons that a current state of charge of a energy storage device 111 may differ from a state of charge curve 200 that is based on historic state of charge data for the same interval of time.

In operation 710, method 700 can determine a next time at which the user has a high probability of charging her computing system. Determining a time at which the user has a high probability of charging her computing system is described above, with reference to FIG. 2 through FIG. 4, and FIG. 6, reference element 625.

In operation 715, method 700 can determine recent energy usage. Recent energy usage can be determined over a period of time such as the last 1 hour or the last 3 hours. Although recent energy usage data is historic state of charge data, recent energy usage differs from generating a state of charge curve 200, as described with reference to FIG. 6, in that recent energy usage is based upon only the most recent data for a period of time, whereas state of charge curve 200 can be based upon multiple similar previous periods of time which may be averaged, or weighted and averaged, to obtain a predicted energy usage for a corresponding to a recent past period of time.

In operation 720, a predicted energy usage can be determined for the period of time between the current time and the predicted next time at which the user has a high probability of charging her computing system that was determined in operation 710. The prediction can be based upon the historic state of charge curve 200, the rate of charge histogram 300, or acceleration of charge histogram 400, or a combination of these. Operation 720 essentially predicts the amount of energy that will be consumed if the user uses the computing system in a manner that she has historically used the computing system from now until her next charge time.

In operation 725, a projected energy usage can be determined for the period of time between the current time and the predicted next time at which the user has a high probability of charging her computing system that was determined in operation 710. The projected energy usage can be projected from the recent battery usage determined in operation 715. Operation 725 essentially projects the amount of energy that will be consumed if the user continues using the computing system in the manner she has recently been using the computing system from now until her next charge time.

In operation 730, recent activity data from database 118B can be compared with historic activity data from the database 118B to determine how, and why, a difference may exist between the predicted and projected energy usage from a current time until the next predicted charge time, and whether the differences may amplify or mitigate energy usage. Amplifying and mitigating factors may include whether the user is using performing the computing function during the projected and predicted periods of time (collectively, "the period of time.") If the user is now playing a high performance video game when he was historically editing a word processing document, off-network, with low screen brightness, the playing of the video game may be an amplifying factor. The opposite scenario may be a mitigating factor. If the user was historically working at home, off-network, at the period of time, and the user is now on a video conference call on a commuter bus such that the computing system is pinging off of multiple cell towers, the video conferencing and cell tower usage may be amplifying factors. The opposite scenario may be mitigating factors. For example, if historic activity data 118B indicates that a user is typically at home using a word video conferencing application while coupled to the Internet using an Ethernet cable or WiFi during the period of time from the current time to the predicted charge time, and the current activity data 118B indicates that the user is using the same application, but is in motion such as on a commuter train, using a cellular network that is utilizing multiple cell towers, the projected energy usage may be higher than the predicted energy usage and the circumstances may be amplifying factors in determining an estimated zero charge point in operation 735. Similarly, if the historic activity data 118B indicates that the user is typically in motion, such as on a commuter train, utilizing multiple cell towers, and the current activity 118B indicates that the user is currently at home where a charger and wall socket are likely available, then the fact that the user is not using higher energy to maintain contact with cell towers and the fact that the user could conveniently charge the computing device at any time are mitigating factors in determining an estimated zero charge point in operation 735.

In operation 735, the predicted and projected energy usage rates for the period of time from the current time to the predicted charge time can be combined to determine an estimated time at which the energy storage device 111 in the computing system will reach zero charge (i.e. the energy storage device 111 will be depleted or all energy). In an embodiment, the predicted and projected energy usage rates for the period of time can be weighted based upon amplifying and/or mitigating factors determined in operation 730. If the estimated zero charge time is before the predicted next charge time, then in operation 740 an appropriate advice to charge notification can be generated to the user.

Figure 8:
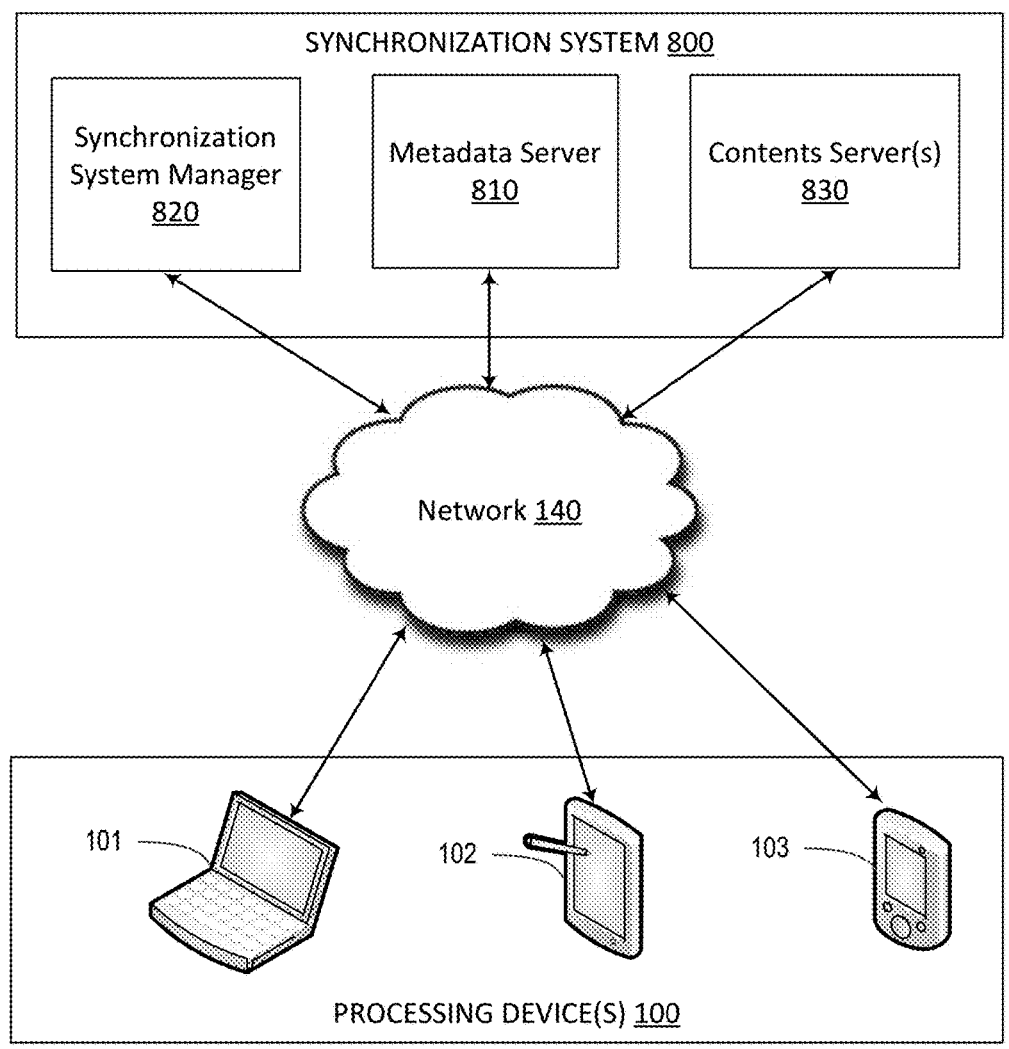
FIG. 8 illustrates, illustrates, in block form, a system for synchronizing state of charge data across devices.

FIG. 8 illustrates, in block form, a system 800 for synchronizing state of charge information across multiple client devices 100 of a user. In an embodiment, state of charge information can be stored on each client device 100 within energy database 118A and activities database 118B. Thus synchronizing state of charge information can include synchronizing energy database 118A for each client device 100. In an embodiment, synchronizing state of charge information across multiple devices can also include synchronizing activities database 118B across multiple client devices 100. In an embodiment, only selected portions of state of charge information are synchronized between multiple client devices. In an embodiment, the selected portions can correspond to state of charge database 118A which a user may have chosen to synchronize between multiple client devices 100.

Synchronization system 800 can include a metadata server 810 and one or more contents servers 830. In one embodiment, a contents server 830 can store one or more types of user data sets such as state of charge information including stored data such as energy database 118A or activities data such as database 118B. User data sets can further include generated data such as a computed histogram 300 or 400 of state charge data 200. User data sets can further include predictors, queries, user feedback history, data, metadata and indices. Another contents server 830 can store, e.g., a contacts user data set, while still another content server 830 can store emails of one or more email accounts of a user. In an embodiment, a content server 830 can be a cloud storage service capable of storing a wide variety of different user data set types. In one embodiment, synchronization system 800 can further include a synchronization management system 820. Initially, client device 100 can store one or more user data sets from the file system of client device 100 on synchronization system 800. A user data set, such as a state of charge information on client device 100, can be stored on the synchronization system 800. In one embodiment, the user data set can be chunked into chunked data portions and stored on the one or more contents servers 830. Metadata describing the user data set and metadata about the chunked portions of the user data set can be stored on the metadata server 810 in a synchronization metadata database. In one embodiment, the metadata server 810 and contents server 830 can be managed using a synchronization management system 820.

Managing the metadata server 810 can include providing software to the metadata server 810 to resolve conflicts between various versions of data sets of a user, including conflicts resulting from different versions of a software that generated a data set. For example, if one client device of a user, e.g. 101, has word processor software that is version 2.0, and the user generates a word processing document using that client device and software, and the document is later downloaded using the synchronization system 800 to a different client device of the user, e.g. 102, having version 1.0 of the word processor software, the version 1.0 software may not be able to open and/or edit the document that was generated by software version 2.0. Synchronization system manager 820 can provide software updates and patches to the metadata server 810 to adapt the document for use with both version 1.0 and version 2.0 of the word processing software.

Synchronization system 800 can be interfaced to the client device(s) 100 via a network 140. Network 140 can be the Internet, a wireless network, a cellular network, a local area network, or any combination of these. Although the synchronization system manager 820, metadata server 810, and contents server 830 have been shown as separate elements, connected via a network 140, this need not be the case. One or more of the synchronization system manager system 820, metadata server 810, or contents server 830 can be implemented on the same host computer system or on several physically distributed computer systems. In addition, as described above, contents server 830 can include one or more content servers 830, any or all of which can store one or more types of user data sets. Communication between one or more of the synchronization system manager 820, metadata server 810, and contents server(s) 830 can be by sockets, messages, shared memory, an application program interface (API), inter-process communication, or other processing communication service. Application programming interfaces are described in detail, below, with reference to FIG. 10.

A client device 100 can include a desktop computer system, a laptop computer system such as client device 101, a tablet computer system such as client device 102, a cellular telephone such as client device 103, a personal digital assistant (PDA) including cellular-enabled PDAs, a set top box, an entertainment system, a gaming device, or other consumer electronic device. The components of a client device 100 are described in detail, below, with reference to FIG. 12.

A user data set can include one or more of: a state of charge information database 118A, an activities database 118B, a predictor, a local search and feedback history database, a local database, a data file, a folder or directory, a word processing document, a spreadsheet, a presentation, emails, texts, user contacts, bookmarks, assets such as music, movies, and other purchased content, device settings, and application settings. Each of these can be a user data set. A user of a client device 100 can determine, on a per-device basis, whether a particular data set will, or will not, be synchronized with other of the user's client devices 100 using the synchronization system 800.

Metadata about user data sets can include file system metadata and synchronization metadata. File system metadata can include a file ID, such as a POSIX file ID, a document ID, a creation date of the file, a date that the file was last modified, an identifier of the device that last modified the file, an identifier of the application and version of the application that modified the file, and a generation count for the file. For assets, such as purchased content that are already stored remotely at a service such as iTunes® or Amazon Cloud®, metadata about the content can include a Universal Resource Locator (URL) that points to where the content is located. File system metadata can be generated by the file system of each client device 100. Synchronization metadata can include a universally unique identifier (UUID) for a file or a directory that is unique across the client devices 100 of a user, and can further include ETAGS. ETAGS can specify a specific version of the metadata for a document or a directory. ETAGS can be generated by the synchronization system 100 to manage the user data sets and resolve conflicts between differing generations of user data for a particular user data set. For example, an ETAG can be used to distinguish different generations of a word processing document of the resume of the user.

Figure 9:
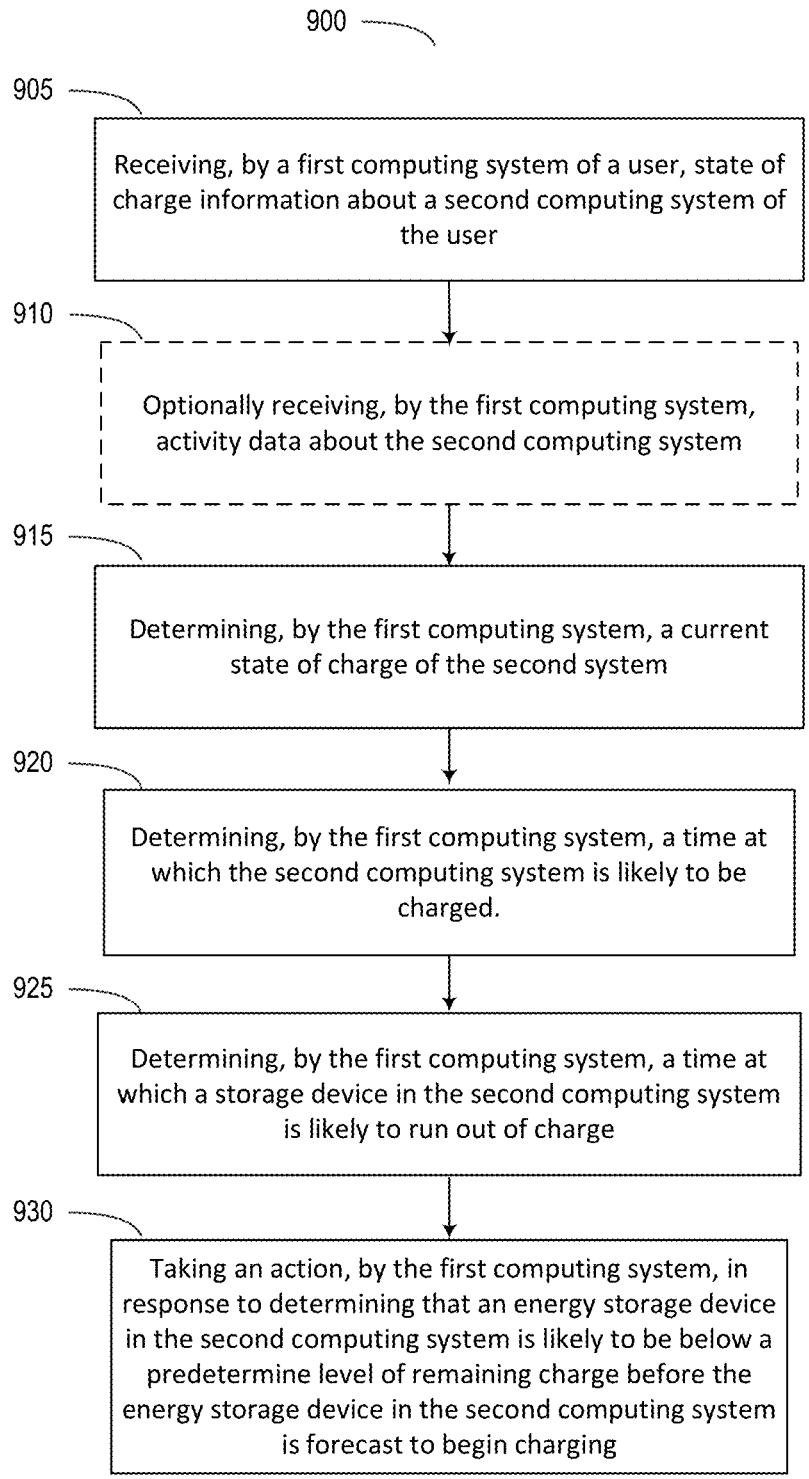
FIG. 9 illustrates a method of using a first computing system of a user to determine that a second computing system of the user needs to be charged.

FIG. 9 illustrates, in block diagram form, a method 900 of notifying a user of a first computing system that a second computing system of the user needs to be charged. For example, an iPhone® (smart phone) could obtain charging information from an Apple Watch® (electronic watch) to determine when the Apple Watch® is typically charged. The iPhone® could also determine whether the Apple Watch® needs to be charged before the next forecast charge for the Apple Watch®. The iPhone® can give the user an appropriate notification, such as an alert message on the iPhone® or Apple Watch®. Similarly, a smart phone can detect that a user is in motion, and such motion indicates that the user will soon arrive at home. Activity information 118B on a tablet computer, such as an iPad®, of the user indicates that the user typically watches the news when the user arrives home. The smart phone can retrieve the state of charge information from the tablet computer, determine whether the tablet needs to be charged, and alert the user on the smart phone to charge the tablet when the user gets home.

In operation 905, a first computing system of the user can acquire state of charge 118A information about a second computing system of the user. In an embodiment, the first computing system can use the synchronization system of FIG. 8 to acquire the state of charge information of the second computing system.

In operation 910, the first computing system can optionally obtain activity data 118B of the second computing system. Activity data can include location information and charging events of the second computing system that correlate to state of charge information of the second computing system.

In operation 915, the first computing system can determine a current state of charge of the second computing system. In an embodiment, the current state of charge of the second computing system can be obtained from the state of charge information of the second computing system. In an embodiment, the second computing system can send one or more state of charge records from the energy database 118A of the second computing system to the first computing system conveying a current state of charge of the second computing system.

In operation 920, the first computing system can determine the time at which the second computing system is likely to charge the energy storage device in the second computing system. Representative operations for performing this operation were described above with reference to FIG. 6.

In operation 925, the first computing system can determine a time at which an energy storage device in the second computing system will likely have a remaining charge level below a predetermined threshold amount, if not charged before the next forecast charging time. Representative operations for performing this operation were described above with reference to FIG. 6.

In operation 930, the first computing system can take an appropriate action responsive to determining that the second computing will need to be charged before the next forecast charging time. An appropriate action can include sending an alert notification to the user on the first computing system, the second computing system, or both.

Figure 10:
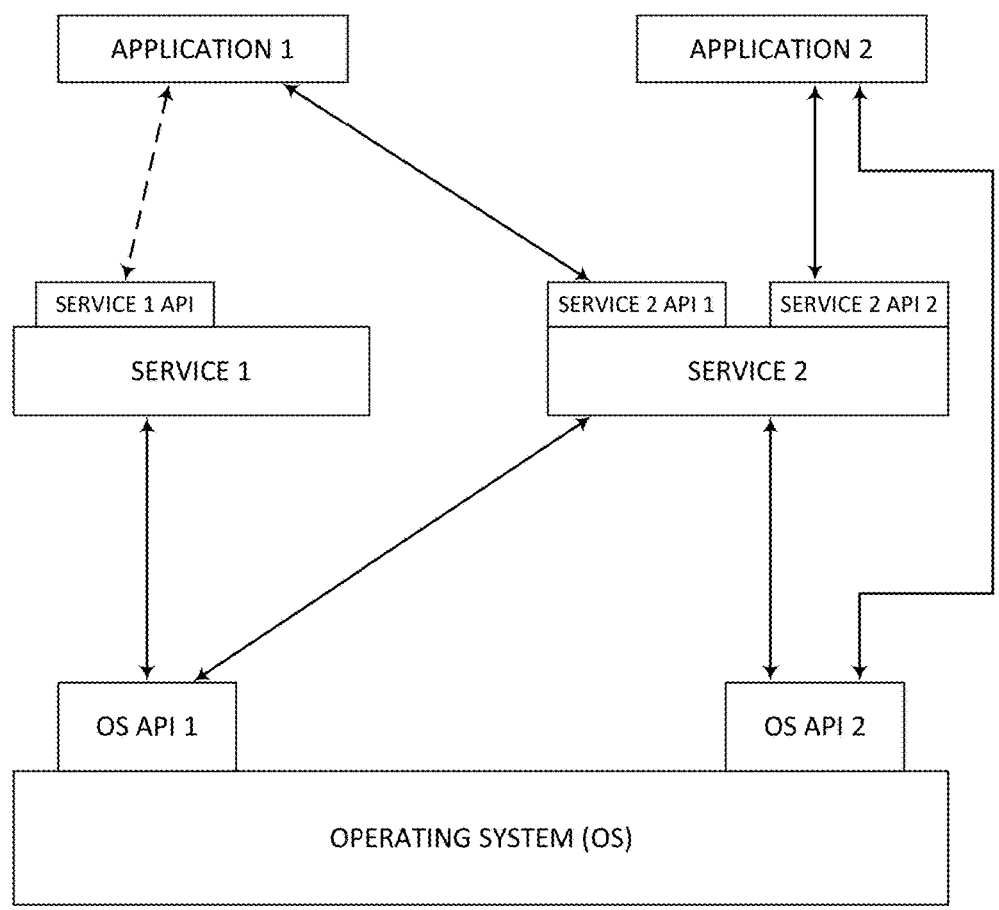
In FIG. 10 illustrates an exemplary embodiment of a software stack usable in some embodiments of the invention

In FIG. 10 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both OS API 1 and OS API 2, Application 2 makes calls to and receives returned values from OS API 2.

Figure 11:
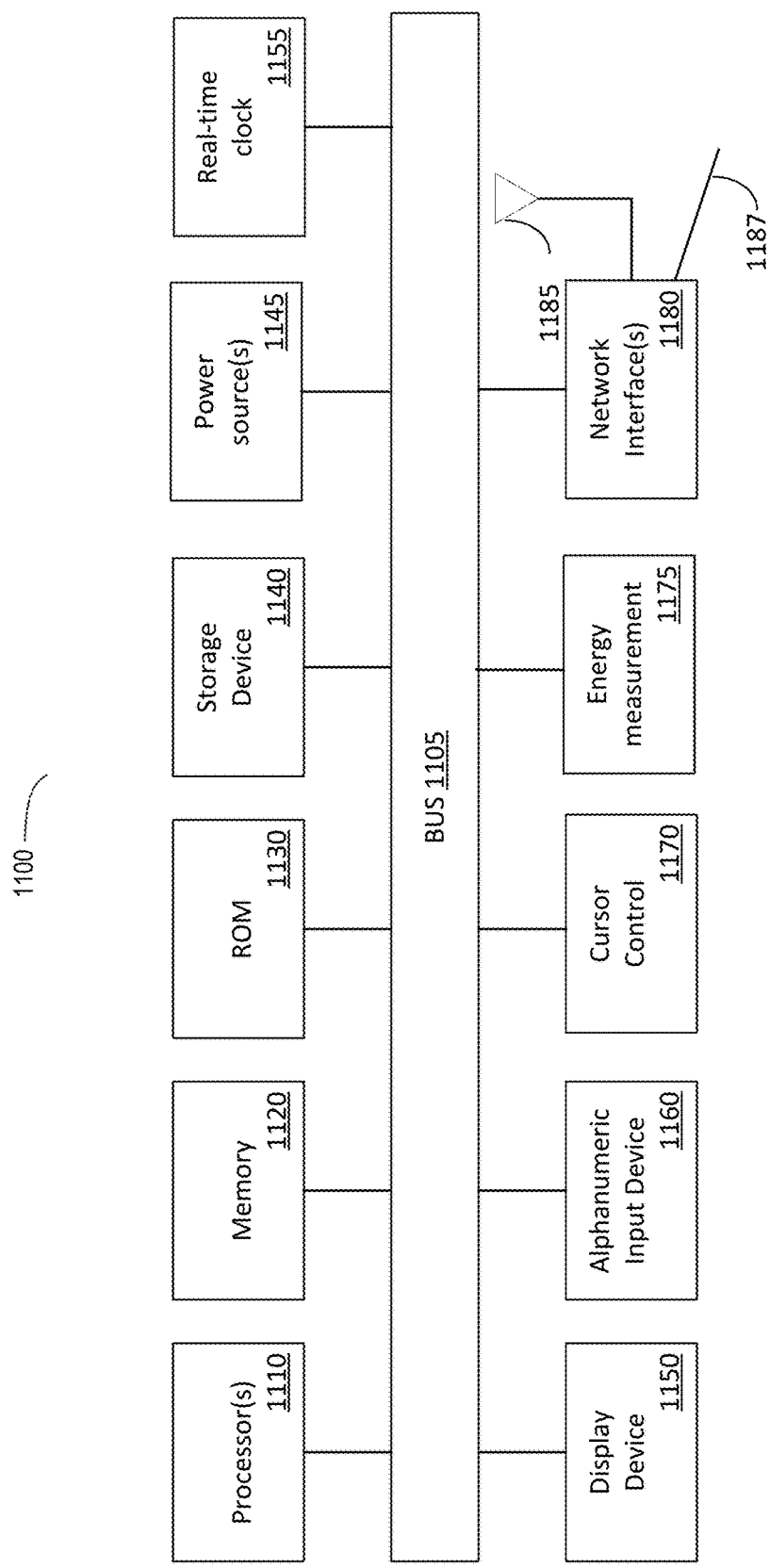
FIG. 11 is a block diagram of one embodiment of a processing system.

The computing system illustrated in FIG. 11 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. Computing system 1100 includes bus 1105 or other communication device to communicate information, and processor 1110 coupled to bus 1105 that may process information.

While computing system 1100 is illustrated with a single processor, computing system 1100 may include multiple processors and/or co-processors 1110. Computing system 1100 further may include random access memory (RAM) or other dynamic storage device 1120 (referred to as main memory), coupled to bus 1105 and may store information and instructions that may be executed by processor(s) 1110. Main memory 1120 may also be used to store temporary variables or other intermediate information during execution of instructions by processor 1110.

Computing system 1100 may also include read only memory (ROM) 1130 and/or other static storage device 1140 coupled to bus 1105 that may store static information and instructions for processor(s) 1110. Data storage device 1140 may be coupled to bus 1105 to store information and instructions. Data storage device 1140 such as flash memory or a magnetic disk or optical disc and corresponding drive may be coupled to computing system 1100.

Computing system 1100 can further include one or more power sources 1145. A power source 1145 can include a battery pack, a capacitive storage device, an AC/DC convertor, a solar power supply, or other AC or DC power supply.

Computing system can also include a real-time clock 1155. Real-time clock 1155 can be a clock/calendar integrated circuit. A clock/calendar integrated circuit can be coupled to a user interface for setting the clock and setting the calendar. The user interface can be integrated into a basic input/output system (BIOS) or can be an user process 130 application. A real-time clock 1155 can further be implemented via a network connection to an external timekeeping source that can provide a current date and time to computing system 1100.

Computing system 1100 can include a energy measurement system 1175. Energy measurement system 1175 can measure energy status of one or more energy producing, storing, or consuming components. Measuring energy status can include measuring a current state of charge of an energy storage device 111, measuring a rate of production of energy from a charging source 112, or measuring energy consumption by one or more components of hardware 120.

Computing system 1100 may also be coupled via bus 1105 to display device 1150, such as a cathode ray tube (CRT) or liquid crystal display (LCD), to display information to a user. Computing system 1100 can also include an alphanumeric input device 1160, including alphanumeric and other keys, which may be coupled to bus 1105 to communicate information and command selections to processor(s) 1110. Another type of user input device is cursor control 1170, such as a touchpad, a mouse, a trackball, or cursor direction keys to communicate direction information and command selections to processor(s) 1110 and to control cursor movement on display 1150.

Computing system 1100 further may include one or more network interface(s) 1180 to provide access to a network, such as a local area network. Network interface(s) 1180 may include, for example, a wireless network interface having antenna 1185, which may represent one or more antenna(e). Computing system 1100 can include multiple wireless network interfaces such as a combination of WiFi, Bluetooth® and cellular telephony interfaces. Network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, network interface(s) 1180 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method, the method comprising:
    determining state of charge data for an energy storage device in an electronic device indicative of a charge level of the energy storage device over a plurality of intervals of time;
    determining a forecasted time at which the energy storage device for the electronic device is forecasted to begin charging based on the state of charge data;
    determining a forecasted time at which the energy storage device for the electronic device is forecasted to have an amount of energy below a predetermined threshold amount based on the state of charge data; and
    before the forecasted time at which the energy storage device for the electronic device is forecasted to have an amount of energy below the predetermined threshold amount, taking an action in response to determining that the forecasted time at which the energy storage device is forecasted to have an amount of energy below the predetermined threshold amount is before the forecasted time at which the energy storage device is forecasted to begin charging.

2. The method of claim 1, wherein the plurality of intervals of time comprise at least a 24 hour period.

3. The method of claim 1, wherein the plurality of intervals of time comprise one of: a particular weekday of a first week and the particular weekday of a second week, or a first weekday and a second weekday of a week.

4. The method of claim 1, wherein the action comprises generating a notification for displays on a device indicating that the energy storage device is forecasted to have an amount of energy below a predetermined threshold amount before the energy storage device is forecasted to begin charging.

5. The method of claim 1, wherein the state of charge data for the energy storage device in the electronic device is generated for each of a plurality of sub-intervals of time for each of the plurality of intervals of time.

6. The method of claim 5, wherein each of the plurality of intervals of time comprises an hour and each of the plurality of sub-intervals of time is 15 minutes.

7. The method of claim 1, further comprising determining acceleration of charge data for the energy storage device in the electronic device indicative of an acceleration rate of the charge level of the energy storage device for a plurality of sub-intervals of time within the plurality of intervals of time based on the state of charge data, and wherein determining the forecasted time at which the energy storage device is forecasted to begin charging comprises identifying, in the acceleration of charge data, a first sub-interval of time of the plurality of sub-intervals of time indicating an acceleration rate above a charging threshold adjacent to a second sub-interval of time of the plurality of sub-intervals of time indicating an acceleration rate below the charging threshold.

8. A non-transitory computer-readable medium programmed with instructions that, when executed by a processing system, perform operations comprising:
    determining state of charge data for an energy storage device in an electronic device indicative of a charge level of the energy storage device over a plurality of intervals of time;
    determining a forecasted time at which the energy storage device for the electronic device is forecasted to begin charging based on the state of charge data; and
    determining a forecasted time at which the energy storage device for the electronic device is forecasted to have an amount of energy below a predetermined threshold amount based on the state of charge data; and
    before the forecasted time at which the energy storage device for the electronic device is forecasted to have an amount of energy below the predetermined threshold amount, taking an action in response to determining that the forecasted time at which the energy storage device is forecasted to have an amount of energy less than the predetermined threshold amount is before the forecasted time at which the energy storage device is forecasted to begin charging.

9. The medium of claim 8, wherein the plurality of intervals of time comprise at least a 24 hour period.

10. The medium of claim 8, wherein the plurality of intervals of time comprise one of: a particular weekday of a first week and the particular weekday of a second week, or a first weekday and a second weekday of a week.

11. The medium of claim 8, wherein the action comprises generating a notification for display on a device indicating that the energy storage device is forecasted to have an amount of energy below the predetermined threshold amount before the energy storage device is forecasted to begin charging.

12. The medium of claim 8, wherein the state of charge data for the energy storage device in the electronic device is generated for each of a plurality of sub-intervals of time for each of the plurality of intervals of time.

13. The medium of claim 12, wherein each of the intervals of time comprises an hour and each of the sub-intervals of time is 15 minutes.

14. The medium of claim 8, wherein the operations further comprise determining acceleration of charge data for the energy storage device in the electronic device indicative of an acceleration rate of the charge level of the energy storage device for a plurality of sub-intervals of time within the plurality of intervals of time based on the state of charge data, and wherein determining the forecasted time at which the energy storage device is forecasted to begin charging comprises using identifying, in the acceleration of charge data, a first sub-interval of time of the plurality of sub-intervals of time indicating an acceleration rate above a charging threshold adjacent to a second sub-interval of time of the plurality of sub-intervals of time indicating an acceleration rate below the charging threshold.

15. A processing system comprising:
one or more processors coupled to a memory programmed with executable instructions that, when executed by the one or more processors, perform operations comprising:
determining state of charge data for an energy storage device in an electronic device indicative of a charge level of the energy storage device over a plurality of intervals of time;
determining a forecasted time at which the energy storage device for the electronic device is forecasted to begin charging based on the state of charge data; and
determining a forecasted time at which the energy storage device for the electronic device is forecasted to have an amount of energy below a predetermined threshold amount based on the state of charge data; and
before the forecasted time at which the energy storage device for the electronic device is forecasted to have an amount of energy below the predetermined threshold amount, taking an action in response to determining that the forecasted time at which the energy storage device is forecasted to have an amount of energy below the predetermined threshold amount is before the forecasted time at which the energy storage device is forecasted to begin charging.

16. The system of claim 15, wherein the action comprises generating a notification for display on a device indicating that the energy storage device is forecasted to have an amount of energy below the predetermined threshold amount before the energy storage device is forecasted to begin charging.

17. The system of claim 15, wherein the state of charge data for the energy storage device in the electronic device is generated for each of a plurality of sub-intervals of time for each of the plurality of intervals of time.

18. The method of claim 1, wherein determining the forecasted time at which the energy storage device is forecasted to begin charging is performed in response to determining that a rate of discharge of the energy storage device exceeds a threshold rate.

19. The method of claim 1, further comprising
determining one or more times at which the energy storage device for the electronic device has historically been charged based on the state of charge data; and
wherein determining the forecasted time at which the energy storage device for the electronic device is forecasted to begin charging is based on the one or more times at which the energy storage device for the electronic device has historically been charged.

20. The medium of claim 8, wherein the operations further comprise
determining one or more times at which the energy storage device for the electronic device has historically been charged based on the state of charge data; and
wherein determining the forecasted time at which the energy storage device for the electronic device is forecasted to begin charging is based on the one or more times at which the energy storage device for the electronic device has historically been charged.

21. The system of claim 15, wherein the operations further comprise
determining one or more times at which the energy storage device for the electronic device has historically been charged based on the state of charge data; and
wherein determining the forecasted time at which the energy storage device for the electronic device is forecasted to begin charging is based on the one or more times at which the energy storage device for the electronic device has historically been charged.

* * * * *

UNITED STATES PATENT AND TRADEMARK OFFICE
CERTIFICATE OF CORRECTION

PATENT NO. : 10,083,105 B2
APPLICATION NO. : 14/871856
DATED : September 25, 2018
INVENTOR(S) : Cyril de la Cropte de Chantérac It is certified that error appears in the above-identified patent and that said Letters Patent is hereby corrected as shown below:

In the Claims

At Column 18, Claim number 4, Line number 11, delete "displays" and replace with --display--.
At Column 19, Claim number 14, Line number 19, delete "using".

Signed and Sealed this
First Day of January, 2019

Andrei Iancu
*Director of the United States Patent and Trademark Office*